(12) United States Patent
Ameloot et al.

(10) Patent No.: US 11,685,113 B2
(45) Date of Patent: Jun. 27, 2023

(54) 3D PRINTING OF POROUS LIQUID HANDLING DEVICE

(71) Applicant: KATHOLIEKE UNIVERSITEIT LEUVEN, Leuven (BE)

(72) Inventors: Rob Ameloot, Leuven (BE); Clement Achille, Leuven (BE)

(73) Assignee: KATHOLIEKE UNIVERSITEIT LEUVEN, Leuven (BE)

( * ) Notice: Subject to any disclaimer, the term of this patent is extended or adjusted under 35 U.S.C. 154(b) by 724 days.

(21) Appl. No.: 16/491,478

(22) PCT Filed: Mar. 6, 2018

(86) PCT No.: PCT/EP2018/055467
§ 371 (c)(1),
(2) Date: Sep. 5, 2019

(87) PCT Pub. No.: WO2018/162476
PCT Pub. Date: Sep. 13, 2018

(65) Prior Publication Data
US 2020/0016829 A1    Jan. 16, 2020

(30) Foreign Application Priority Data

Mar. 6, 2017  (GB) ...................... 1703519
May 31, 2017  (GB) ...................... 1708644
Jun. 16, 2017  (LU) ...................... 100297

(51) Int. Cl.
*B33Y 10/00*    (2015.01)
*B33Y 80/00*    (2015.01)
*B29C 64/165*   (2017.01)
*B01L 3/00*     (2006.01)
*B29K 33/00*    (2006.01)
*B29L 31/00*    (2006.01)

(52) U.S. Cl.
CPC ...... *B29C 64/165* (2017.08); *B01L 3/502707* (2013.01); *B33Y 10/00* (2014.12);
(Continued)

(58) Field of Classification Search
None
See application file for complete search history.

(56) References Cited

U.S. PATENT DOCUMENTS 5,136,151 A    8/1992  Kobayashi
5,204,055 A    4/1993  Sachs et al.
(Continued)

FOREIGN PATENT DOCUMENTS

EP    2747986        7/2014
WO    2013030064 A1  3/2013
(Continued)

OTHER PUBLICATIONS

International Search Report dated Feb. 4, 2019 in co-pending International Application No. PCT/EP2018/055467.
(Continued)

*Primary Examiner* — Paul S Hyun
(74) *Attorney, Agent, or Firm* — Dinsmore & Shohl, LLP (57) ABSTRACT

The present invention relates to a method for three dimensional printing of a porous object enabling the capillary transport of hydrophilic fluids, for use as liquid handling device, for example as a point of care diagnostic device. The invention also provides the porous object obtainable or obtained by such methods, and its use in liquid handling or as a point of care diagnostic device.

12 Claims, 5 Drawing Sheets

(52) U.S. Cl.
CPC ......... *B33Y 80/00* (2014.12); *B01L 2300/027* (2013.01); *B01L 2300/0663* (2013.01); *B01L 2300/0861* (2013.01); *B01L 2300/12* (2013.01); *B01L 2300/161* (2013.01); *B01L 2300/165* (2013.01); *B01L 2400/0406* (2013.01); *B29K 2033/12* (2013.01); *B29K 2995/0093* (2013.01); *B29L 2031/753* (2013.01)

(56) References Cited

U.S. PATENT DOCUMENTS

| | | | |
|---|---|---|---|
| 5,260,009 | A | 11/1993 | Penn |
| 5,340,656 | A | 8/1994 | Sachs et al. |
| 5,387,380 | A | 2/1995 | Cima et al. |
| 5,633,021 | A | 5/1997 | Brown et al. |
| 6,589,471 | B1 * | 7/2003 | Khoshnevis ........ B29B 17/0404 264/308 |
| 9,089,388 | B2 | 7/2015 | Zegarelli |
| 2003/0114936 | A1 * | 6/2003 | Sherwood ............. B29C 64/165 435/402 |
| 2008/0206297 | A1 * | 8/2008 | Roeder ...................... C08J 9/28 424/422 |
| 2012/0105534 | A1 | 5/2012 | Boday et al. |
| 2015/0352639 | A1 | 12/2015 | Toyserkani et al. |
| 2016/0095541 | A1 | 4/2016 | Wang et al. |

FOREIGN PATENT DOCUMENTS

| | | |
|---|---|---|
| WO | 2013112882 A1 | 8/2013 |
| WO | 2013121230 A1 | 8/2013 |
| WO | 2013159117 A1 | 10/2013 |

OTHER PUBLICATIONS

Chen et al, "A fluidic diode, valves, and a sequential-loading circuit fabricated on layered paper," Lab on a Chip, 2012, 12, pp. 2090-2913.

Charles W. Extrand, "Spin Coating of Very Thin Polymer Films," Polymer Engineering and Science, Mar. 1994, vol. 34, No. 5, pp. 390-394.

Fu et al., "Controlled reagent transport in disposable 2D paper networks," Lab Chip, 2010, 10, pp. 918-920.

Glasschroeder et al., "Powder-bed-based 3D-printing of function integrated parts," Rapid Prototyping Journal, 21, 2015, pp. 207-215.

Lewis et al., "High throughput method for prototyping three-dimensional, paper-based microfluidic devices," Lab on a Chip, 2012, 12, pp. 2630-2633.

Lewis et al., "Quantifying analytes in Paper-Based Microfluidic Devices Without Using External Electronic Readers," Angewandte Chemie International Edition, 2012, 51, pp. 12707-12710.

Lewis et al., "Phase-Switching Depolymerizable Poly(carbamate) Oligomers for Signal Amplification in Quantitative Time-Based Assays," Macromolecules, 2013, 46, pp. 5177-5183.

Lutz et al., "Dissolveable fluidic time delays for programming multi-step assays in instrument-free paper diagnostics," Lab on a Chip, 2013, 13, pp. 2840-2847.

Martinez et al., "Diagnostics for the Developing World: Microfluidic Paper-Based Analytical Devices," Analytical Chemistry, 82, 2010, pp. 3-10.

Martinez et al., "Three-dimensional microfluidic devices fabricated in layered paper and tape," 2008, Proceedings of the National Academy of Sciences, 105, 2008, pp. 19606-19611.

Noh et al., "Fluidic timers for Time-Dependent, Point-of-Care Assays on Paper," Analytical Chemistry, 82, 19, 2010, pp. 8071-8078.

Pollock et al., "A Paper-Based Multiplexed Transaminase Test for Low-Cost, Point-of-Care Liver Function Testing," Science Translational Medicine, 2012, 4, pp. 1-10.

Utela et al., "Development Process for Custom Three-Dimensional Printing (3DP) Material Systems," Journal of Manufacturing Science and Engineering, 2010, 132, pp. 011008-1-011008-9.

Weisbrod et al., "Effective Darcy-scale contact angles in porous media imbibing solutions of various surface tensions," Water Resources Research, 45, 2009, pp. 1-10.

* cited by examiner

Device CAD model

Internal microfluidic channel

Figure 5

Device CAD model 3D printed PMMA structure

Figure 6

Prior testing

After testing

3D PRINTING OF POROUS LIQUID HANDLING DEVICE

FIELD OF THE INVENTION

The present invention relates to methods for three dimensional printing of a porous object enabling the capillary transport of hydrophilic fluids, for use as liquid handling device, for example as a point of care diagnostic device. The invention also provides the porous object obtainable or obtained by such methods, and its use in liquid handling or as a point of care diagnostic device.

BACKGROUND OF THE INVENTION

Rapid diagnostic testing at the site of a patient, so-called 'point-of-care' (POC) testing, is essential to provide healthcare when a fully equipped laboratory is not accessible. In developing countries, suitable POC diagnostics could yearly save millions of lives by early diagnosis of a small number of treatable conditions identified by the World Health Organization (WHO). As a result of the inverse correlation between the number of lives saved and the level of diagnostic infrastructure required, the WHO defined guidelines for viable developing world diagnostics that underscore the need for low-cost, disposable assays that require minimal user-dependent steps and are equipment-free (i.e. without the need for external readers, electricity, electronic timers, etc.).

Lateral flow tests (e.g. home pregnancy tests) are one of the few technologies that meet these criteria. In these tests, the liquid sample wicks through a porous paper-like membrane driven by capillarity and readout occurs by eye (e.g. the appearance of colored lines). Notwithstanding their success, lateral flow tests are typically not quantitative and their sensitivity is limited as chemical signal amplification is not possible. More sensitive amplification-based analyses (e.g. enzyme-linked immunosorbent assays, ELISAs) require a precisely timed sequence of steps: pretreatment of the sample (e.g. plasma separation), addition of reagents, washing steps, incubation and result readout. Sparked by the success of lateral flow strips, there have been many attempts to automate a timed assay sequence in so-called 'passive microfluidics' that are driven solely by capillary flow. These approaches are based on defining 3D flow paths within stacks of porous membranes that are individually functionalized with hydrophobic/hydrophilic patterns and assay reagents [Lutz et al (2013) *Lab Chip* 13 2840-2847; Noh et al (2010) *Anal. Chem.* 82 4181-4187; Lewis et al (2012) *Lab Chip* 12 2630-2633; Lewis et al (2012) *Angew. Chem. Int. Ed.* 51 12707-12710; Pollock et al (2012) *Science Translational Medicine* 4 1-10; Fu et al (2010) *Lab on a Chip* 10 918-920; Martinez et al (2010) *Analytical Chemistry* 82 3-10]. While these passive microfluidics are undoubtedly low-cost, integrating amplification-based assays requires bonding many compressible porous layers without affecting their fluid transport properties [Martinez et al (2008) *Proceedings of the National Academy of Sciences* 105 19606-11]. The resulting interlayer contact issues lead to unpredictable or defective devices (~30% for a 7-layer assembly) [Lewis et al (2012) Angew. Chem. Int. Ed. 51 12707-12710].

Currently there is still no ideal technology platform for diagnostic testing in developing countries and there is a need for a method for providing a novel POC. The ideal POC test would combine the best of both lateral flow and ELISA tests. In addition, given the proportions of the targeted challenge, scalable fabrication is essential.

Since the performance issues in the passive multistep assays tested thus far seem intrinsic to their manufacturing method (i.e. bonding stacks of compressible porous layers without altering fluid transport properties), the laminated membrane format is abandoned. Instead, a radically new method is proposed to fabricate "monolithic" passive microfluidics, namely through 3D printing (3DP). Thus far, 3DP has mainly been employed in applications where geometrical shape defines the printed object function (e.g. product design). Other applications for 3DP include to produce products enabling chemical or biological reactions (WO2013121230, WO2013159117) or for drug delivery applications (WO2013112882, U.S. Pat. No. 9,089,388B2).

Inkjet 3D printing of microfluidics has been performed by 2-photon writing methods wherein a pattern of channels is carved out by a pulsed laser source. US20120105534 describes a method wherein a microfluidic device is made using a hydrophobic material such as PTHPMA for the bulk of the device and a hydrophobic material with a hydrolysable group and a photoacid generator for the sections defining the channels. After 3D printing the device is exposed to UV which renders the material with the hydrolysable group hydrophilic.

WO2013030064 discloses layered objects wherein water based suspensions of fine powders are deposited. Channels are made by selectively adding a hydrophic material. This material repels a subsequently added water based suspensions, leaving a gap. The gap is filled with a secondary sacrificial material. After completing of the object, the object is sintered to solidify the powder and to remove the secondary material.

SUMMARY OF THE INVENTION

The present invention provides a novel method for providing a porous subject suitable for 'passive microfluidics', i.e. driven by capillary flow.

The methods of the present invention have the advantage that the devices can be prepared without the need of laser equipment.

The methods of the present invention have the advantage that the devices can be prepared without the need of a UV source, or with material that is not compatible with UV radiation.

The methods of the present invention have the advantage that the devices can be prepared using one type of particulate material, which does not require reactive groups on a particulate material.

The methods and devices of the present invention have several differences and advantages over prior at methods such as disclosed in WO2013030064.

In the methods of the present invention one type of particular material is use, making the use of a second material sacrificial unnecessary. The channels in a device obtained by the methods of the present are not empty channels, but still contain particles. Hydrophilic liquids flow via the cavities in between the particles, leading to a more intimate between fluid and particle wall. This has the advantage that the interaction between an analyte and capturing/detecting agent will be more efficient than in channels where the interaction only occurs at the wall of the channel.

The methods of the present invention do not require heat treatments to remove the secondary material. This allows as well to use particulate material which is heat sensitive as to include in the channels of the device heat labile compounds.

Methods wherein sintering is used to solidify the powder and/or to remove secondary material restrict the choice of materials and fields of applications. Method and devices of the present invention are summarized in the following statements.

1. A method for three dimensional printing of a porous object, said object comprising hydrophobic sections delineating one or more sections enabling the capillary transport of hydrophilic fluids; said method involving the use of a print device comprising a powder bed plate, means for spreading a powder material on said powder bed plate in order to provide a powder bed within a defined area, one or more depositing outlets for depositing at least one printing liquid on said powder bed and means for repositioning said depositing outlets with respect to the surface of said powder bed, wherein said printing device allows for selectively depositing one or more printing liquids with varying compositions and physicochemical properties at predetermined positions on the powder bed;
said method comprising the steps of:
a) Providing one or more printing liquids wherein at least one printing liquid comprises a hydrophobizing agent, referred to as hydrophobizing printing liquid and at least one printing liquid comprises an agent suitable for binding the powder material of step (b), referred to as binder;
b) spreading a layer of a wettable powder material over said powder plate in order to create a powder bed;
c) depositing one or more of said printing liquids at predetermined positions on said powder bed, wherein the depositing of said printing liquid comprising a binder results in the binding of the powder particles at its depositing position and wherein the selective depositing of said hydrophobizing printing liquid on the powder bed provides for said hydrophobic sections of said porous object.

2. The method according to statement 1 wherein each of said one or more printing liquids has a different composition and wherein said selective depositing of said one or more printing liquids at predetermined positions on the powder bed provides specific physical and/or chemical properties to different portions of said object.

3. The method according to statements 1 or 2 wherein said hydrophobizing printing liquid comprises a hydrophobizing agent selected from the group consisting of waxes, silanes, alkyl and alkenyl ketene dimers, acid anhydrides, including alkyl anhydrides and alkenyl succinic anhydride, hydrophobic polymers, hydrophobic particles, fluorinated molecules, molecules containing apolar hydrocarbon moieties and any combinations thereof.

4. The method according to any one of the statement 1 to 3 wherein said hydrophobizing printing liquid further comprises a binder.

5. The method according to any one of the statements 1 to 4, wherein said binder is selected from the group consisting of acetophenone, butanone, hexanone, propanone, methylethylketone, pentanone, toluene, chloroform, ethyl acetate and any combinations thereof.

6. The method according to any one of the statements 1 to 5 wherein said print device comprises at least one outlet for depositing at least one printing liquid on said powder bed and wherein each of the at least one respective printing liquids is deposited on the powder bed from a different depositing outlet.

7. The method according to any one of the statements 1 to 6 wherein said powder material comprises an organic and/or an inorganic particulate material having a particle size varying between 1 µm and 250 µm.

8. The method according to any one of the statements 1 to 7 wherein said powder material comprises a polymer and wherein said binder is a solvent for said polymer.

9. The method according to statement 8 wherein said polymer is polymethyl methacrylate and wherein said binder is selected from the group consisting of acetophenone, butanone, propanone, hexanone and any combinations thereof.

10. The method according to any one of the statements 1 to 9 wherein said print device is a 3D print device comprising means for lowering said powder bed plate and wherein said method comprises the additional steps of:
d) lowering the powder bed;
e) repeating steps (c) and (d) until the object is formed, whereby at each repetition of step (c) an additional layer of the porous object is formed and wherein at least part of the powder material of the powder bed is bound to bound material of the layer formed in the previous step (c) wherein said binding of layers results from the directed depositing of said printing liquid comprising said binder; and wherein said object comprises at least one section that is accessible for applying a hydrophilic fluid sample and that enables capillary transport of hydrophilic fluids.

11. The method according to statement 10 wherein said section for applying a hydrophilic fluid sample connects with an internal section of said object enabling capillary transport of hydrophilic fluids.

12. The method according to statements 10 or 11 wherein said sections of said porous object enabling capillary transport of hydrophilic fluids are interconnected in a microfluidic network suitable for the capillary transport along a predefined path of a hydrophilic fluid sample applied on said at least one accessible dedicated section of said object, said dedicated section being part of said microfluidic network.

13. The method according to any one of statements 10 to 12 wherein said microfluidic network comprises microfluidic chambers and/or channels.

14. The method according to statement 13 wherein said microfluidic chambers and/or channels have a height of about 100 µm to about 10000 µm.

15. The method according to statements 13 or 14 wherein said microfluidic chambers and/or channels have a width of about 100 µm to about 10000 µm.

16. The method according to any one of statements 11 to 15 wherein said microfluidic network comprises zones comprising compounds for capturing and/or detecting analytes contained in said hydrophilic fluid sample applied on said at least one dedicated section, wherein said compounds for analyte detection and/or capture are introduced in said network by selectively depositing a printing liquid comprising said compound for analyte detection and/or capture at predetermined positions on said powder bed.

17. The method according to statement 16, wherein said analyte detection compound is selected from the group consisting of a pH indicator, an antibody, a DNA molecule, a RNA molecule, an enzyme, an enzyme substrate, a color indicator, an enzyme cofactor, an enzyme inhibitor, an antibody-enzyme conjugate, a labeled antibody, a chemical reactant and a buffer.

18. The method according to any one of the statements 10 to 17 wherein said porous object is a device for liquid handling.

19. The method according to any one of the statements 10 to 18 wherein said porous object is a point of care diagnostic device wherein said device comprises a read-out section that is part of said microfluidic network and that is adapted to provide a signal depending on either the presence, absence or concentration of an analyte in a hydrophilic fluid sample applied on said dedicated section.

20. A porous object comprising hydrophobic sections delineating one or more sections enabling the capillary transport of hydrophilic fluids prepared by three-dimensional printing according to the method of any one of the statements 1 to 19.

21. The porous object according to statement 20 wherein said object is a liquid handling device.

22. The porous object according to statement 20 wherein said object is a point of care diagnostic device.

23. A method for three dimensional printing of a porous device for liquid handling comprising hydrophobic sections delineating one or more interconnected chambers and/or channels enabling the capillary transport of hydrophilic fluids; said method comprising the steps of:
a) Providing a print device comprising:
  means for spreading a powder material on a powder bed surface,
  one or more depositing outlets for depositing at least one printing liquid on said powder bed,
  means for repositioning said depositing outlets with respect to the surface of said powder bed, wherein said printing device allows for selectively depositing one or more printing liquids on the powder bed and,
  one or more printing liquids characterized in that at least one printing liquid comprises a hydrophobizing agent, and at least one printing liquid comprises an binder agent suitable for binding powder material;
b) spreading a layer of a particulate powder material over said powder plate in order to create a powder bed;
c) depositing one or more of said printing liquids comprising an agent suitable for binding powder material at predetermined positions on said powder bed, thereby binding the powder particles and depositing one or more of said printing liquids comprising a hydrophobizing agent at predetermined positions on said powder bed, thereby providing hydrophobic sections on the powder particles,
d) lowering the powder bed and spreading an additional layer of powder material;
e) repeating steps (c) and (d) until the object is formed, whereby at each repetition of step (c) an additional layer of the porous object is formed and wherein at least part of the powder material of the powder bed is bound to bound material of the layer formed in the previous step (c) wherein said binding of layers results from the directed depositing of said printing liquid comprising said binder agent, and wherein the successive depositing of the one or more printing liquids comprising the hydrophobising agent results in delineating one or more interconnected chambers and/or channels enabling the capillary transport of hydrophilic fluids within the hydrophobic sections.

24. A method for three dimensional printing of a porous device for liquid handling comprising hydrophobic sections delineating one or more interconnected chambers and/or channels enabling the capillary transport of hydrophilic fluids; said method, which is a method without sintering, comprising the steps of:
a) Providing a print device comprising:
  means for spreading a powder material on a powder bed surface,
  one or more depositing outlets for depositing at least one printing liquid on said powder bed,
  means for repositioning said depositing outlets with respect to the surface of said powder bed, wherein said printing device allows for selectively depositing one or more printing liquids on the powder bed and,
  one or more printing liquids characterized in that at least one printing liquid comprises a hydrophobizing agent, and at least one printing liquid comprises an binder agent suitable for binding powder material;
b) spreading a layer of powder of a particulate material over said powder plate in order to create a powder bed;
c) depositing one or more of said printing liquids comprising an agent suitable for binding powder material at predetermined positions on said powder bed, thereby binding the powder particles and depositing one or more of said printing liquids comprising a hydrophobizing agent at predetermined positions on said powder bed, thereby providing hydrophobic sections on the powder particles,
d) lowering the powder bed and spreading an additional layer of powder of the particulate material, wherein the powder is applied on top of both hydrophobic regions and hydrophilic regions of the underlying layer obtained in c);
e) repeating steps (c) and (d) until the object is formed, whereby at each repetition of step (c) an additional layer of the porous object is formed and wherein at least part of the powder material of the powder bed is bound to bound material of the layer formed in the previous step (c),
wherein said binding of layers results from the directed depositing of said printing liquid comprising said binder agent, and wherein the successive depositing of the one or more printing liquids comprising the hydrophobising agent results in delineating one or more interconnected chambers and/or channels within the hydrophobic sections wherein the chambers and/or channels are filled with hydrophilic particulate material enabling the capillary transport of hydrophilic fluids in between the hydrophilic particulate material.

25. The method according to claim 23 or 24, comprising the step of selectively depositing a printing liquid comprising a compound for capturing and/or detecting an analyte in a dedicated zone of the microfluidic channels/and or chambers.

26. The method of claim 1, wherein the object is dried to remove solvents at a temperature of at most 40° C.

27. The method according to any statement 23 or 24, wherein one or more printing liquids comprising the hydrophobising agent further also comprises binder agent.

28 The method according to statement 23 or 24, using a printing liquid comprising binder agent without hydrophobising agent and a separate printing liquid comprising a hydrophobising agent without binder agent.

29. The method according to statement 23 or 24, wherein in step c) there is no deposition of a binder agent on the regions forming the channels and/or chambers.

30. The method according to statement 23 or 24, wherein in step c) there is no deposition of a printing liquid on the regions forming the channels and/or chambers.

31. The method according to any one of the statements 23 to 30 wherein said hydrophobizing agent is selected from the group consisting of waxes, silanes, alkyl and alkenyl ketene dimers, acid anhydrides, including alkyl anhydrides and alkenyl succinic anhydride, hydrophobic polymers, hydrophobic particles, fluorinated molecules, molecules containing apolar hydrocarbon moieties and any combinations thereof.

32. The method according to any one of statements 23 to 31, wherein said binder is selected from the group consisting of acetophenone, butanone, hexanone, propanone, methylethylketone, pentanone, toluene, chloroform, ethyl acetate and any combinations thereof.

33. The method according to any one of statements 23 to 32 wherein different printing liquids are deposited on the powder bed from a different depositing outlet.
34. The method according to any one of statements 23 to 33 wherein said powder material comprises an organic and/or an inorganic particulate material having a particle size varying between 1 μm and 250 μm.
35. The method according to any one of statements 23 to 34 wherein said powder material comprises a polymer and wherein said binder is a solvent for said polymer.
36. The method according to statement 35 wherein said polymer is polymethyl methacrylate and wherein said binder is selected from the group consisting of acetophenone, butanone, propanone, hexanone and any combinations thereof.
37. The method according to statement 23 or 24 wherein the successive depositing of the one or more printing liquids further results in a section for applying a hydrophilic fluid sample which is connected with the one or more chambers and/or channels.
38. The method according to any one of the statements 23 to 37 wherein said chambers and/or channels have a height of about 100 μm to about 10000 μm.
39. The method according to any one of the statements 23 to 38 wherein said microfluidic chambers and/or channels have a width of about 100 μm to about 10000 μm.
40. The method according to any one of statements 23 to 39, comprising the step of selectively depositing a printing liquid comprising a compound for capturing and/or detecting an analyte in a dedicated zone of the microfluidic channels/and or chambers.
41. The method according to statement 40, wherein said compound for capturing and/or detecting an analyte is selected from the group consisting of a pH indicator, an antibody, a DNA molecule, a RNA molecule, an enzyme, an enzyme substrate, a color indicator, an enzyme cofactor, an enzyme inhibitor, an antibody-enzyme conjugate, a labeled antibody, a chemical reactant and a buffer.
42. A liquid handling device with microfluidic channels comprising a layer-by-layer printed three-dimensional body of particulate material, with cavities in-between said particulate matter, wherein said particulate material is treated with a, hydrophobizing agent making the cavities impermeable for an hydrophilic fluid sample, with the exception of one more regions wherein the particulate material is untreated with a hydrophobizing agent, the regions defining one or more interconnected channels and/or chambers for capillary transport of a hydrophilic fluid sample via the cavities between the particulate material, and wherein said device comprises a section for applying said hydrophilic fluid sample wherein said section is connected with said interconnected chambers and/or channels.
43. A liquid handling device with microfluidic channels comprising a layer-by-layer printed three-dimensional body of particulate material, with cavities in-between the particulate matter, wherein said particulate material is treated with a, hydrophobizing agent making the cavities inbetween the particular matter impermeable for an hydrophilic fluid sample, characterized in the presence one more regions wherein the particulate material is untreated with a hydrophobizing agent, the regions of untreated particulate matter defining within the device one or more interconnected channels and/or chambers for capillary transport of a hydrophilic fluid sample via the cavities between the untreated particulate material, and wherein said device comprises a section for applying said hydrophilic fluid sample wherein said section is connected with said interconnected chambers and/or channels.
44. The device according to statement 42 or 43, wherein said device is a point of care diagnostic device.
45. The device according to any one of statements 42 to 44, wherein said device comprises a read-out section that is part of said interconnected chambers and/or channels and that is adapted to provide a signal depending on either the presence, absence or concentration of an analyte in said hydrophilic fluid sample.
46. The device according to any one of statements 42 to 45, wherein said hydrophobizing agent is selected from the group consisting of waxes, silanes, alkyl and alkenyl ketene dimers, acid anhydrides, including alkyl anhydrides and alkenyl succinic anhydride, hydrophobic polymers, hydrophobic particles, fluorinated molecules, molecules containing apolar hydrocarbon moieties and any combinations thereof.
47. The device according to any one of statements 42 to 46, wherein the particulate material is selected from the group consisting of polymethyl methylacrylate (PMMA), acrylonitrile butadiene styrene (ABS), poly lactic acid (PLA), poly styrene (PS), poly vinyl alcohol (PVA), nylon, cellulose, nitrocellulose, cellophane, and copolymers or block copolymers thereof.
48. The device according to any one of statements 42 to 47, wherein the particulate material is selected from the group consisting of PMMA and PS and copolymers or block copolymers thereof.
49. The device according to any one of statements 42 to 48, wherein dedicated zones of the microfluidic channels/and or chambers comprising a compound for capturing and/or detecting an analyte.
50 The device according to statement 49, wherein said compound for capturing and/or detecting an analyte is selected from the group consisting of a pH indicator, an antibody, a DNA molecule, a RNA molecule, an enzyme, an enzyme substrate, a color indicator, an enzyme cofactor, an enzyme inhibitor, an antibody-enzyme conjugate, a labeled antibody, a chemical reactant and a buffer.

DETAILED DESCRIPTION

Legends to the Figures

FIG. 5 shows the device CAD model of the digital 3D representation of a pH reactive microfluidic network (left) and its internal microfluidic channel (right). Left: hydrophilic sample pad (section for applying a hydrophilic fluid sample) is centered on the top face (large white square); hydrophilic readout sections/pads are located on the top face upper part (two small white squares); internal hydrophilic channel location with reactive areas is depicted by gray contour line; hydrophobic body is displayed in black with readout instructions printed on top. Right: a hydrophilic channel transporting hydrophilic fluid sample is depicted in light gray and adjacent connected hydrophilic reactive areas in dark grey.

DEFINITIONS

As used herein, "three-dimensional (3D) printing" refers to a process that sequentially stacks layers each having a predetermined cross-sectional shape to produce 3D objects layer-by-layer from digital designs. The basic process of 3D printing has been described in U.S. Pat. Nos. 5,204,055; 5,136,151; 5,260,009; 5,340,656; 5,387,380; and 5,633,021. Reference can be made to the patents listed above for a detailed description of 3D printing.

There are different 3D printing technologies; their main differences concern the way in which the various layers are printed. Some methods, in order to produce the various layers, use materials that melt or soften. Some examples of such technology are "Selective Laser Sintering" (SLS) or "Direct Metal Laser Sintering" (DMLS) or "Fused Deposition Modeling" (FDM). Within the context of the present invention, a preferred 3D printing method is an inkjet 3D printing system. The printer creates the model one layer at a time by spreading a layer of powder (e.g. plaster or resins) and printing a binder in the cross-section of the part using an inkjet-like process. This is repeated until every layer has been printed. This technology allows the printing of full color prototypes, overhangs, and elastomer parts. The strength of bonded powder prints can be enhanced with wax or thermoset polymer impregnation.

The materials usually used for 3D printing are: plastic materials, for example thermoplastic polymers (for example for SLS and FDM), metals, sand, glass (for example for SLS), photopolymers (for example for stereolithography), laminated sheets (often of the paper type) and relative glues, titanium alloys (for example for "Electron beam melting" or EBM), resins, clays, ceramic, etc.

"Porous" or "porosity" refers to the void spaces in a material. Porosity can be expressed as the fraction of the volume of voids over the total volume of the 3D printed material. Parameters which influence the porosity of the 3D printed material are for example the size of the particulate matter, the shape of the particulate matter, the size distribution of the particulate matter, the preparation of the powder bed, the type and amount of binder and the conditions of connecting the particulate matter with a binder. In contrast to e.g. an extruded material wherein the porosity is caused by air bubbles in a material, the 3D printed materials of the present invention are typically aggregates of globular particular material, whereby the contacts between individual particles are melted together in a less or greater degree, depending on the binding conditions. The porosity is thus generated by interconnected cavities inbetween the individual particular which form a network throughout the 3D printed material. The fact that a material has a certain porosity whereby cavities make a network through the 3D printed material does not mean "per se" that the material allows gas or liquid transport. As illustrated in the present invention, the surface of the particulate matter prevails over the porosity for determining whether a liquid will be able to migrate through the porous material.

"Capillary transport" (or capillarity, capillary motion, or wicking) as used herein refers to the ability of a fluid such as a liquid to flow in narrow spaces without the assistance of, or even in opposition to, external forces like gravity. It occurs because of intermolecular forces between the liquid and surrounding solid surfaces. If the diameter of the channels in a porous network are sufficiently small, then the combination of surface tension (which is caused by cohesion within the liquid) and adhesive forces between the liquid and the channel walls act to propel the liquid.

"Hydrophobic" as used herein refers to repelling water, such as a hydrophobic surface wherein said surface repels water. The hydrophobicity of a surface can be measured, for example, by determining the contact angle of a drop of water on the surface. On an extremely hydrophilic surface, a water droplet will completely spread over the surface and exhibit a contact angle of approximately 0°. This situation arises for surfaces that absorb water or have a high affinity for water. A hydrophilic surface as used herein refers to a surface which can have a water contact angle of less than about 90°, more preferably less than about 70°, even more preferably less than about 50°. For example, many hydrophilic surfaces have contact angles from around 10° to 30°. A hydrophobic surface as used herein thus refers to a surface that has a water contact angle greater than about 90°, preferably greater than about 105°, more preferably greater than about 110° or above. A superhydrophobic surface is for example considered to exhibit a contact angle greater than about 140°, and a non-wetting surface has a contact angle of 180°. The contact angle can be a static contact angle or dynamic contact angle. A dynamic contact angle measurement can include determining an advancing contact angle or a receding contact angle, or both. A hydrophobic surface having a small difference between advancing and receding contact angles (i.e., low contact angle hysteresis) can be desirable. Water can travel across a surface having low contact angle hysteresis more readily than across a surface having a high contact angle hysteresis. A measurement method for powder contact angles is described in Weisbrod et al (2009) *Water*

*Resources Research* 45, wherein a porous media column is placed in contact with water, allowing the fluid to wick through. The column weight change is recorded during the wicking process until water front stops. The contact angle is determined from the mass change as a function of time.

Flat surfaces for contact angle determination can be generated by spincoating. PMMA surfaces can be obtained by spincoating PMMA solutions in acetone onto glass surfaces. For contact angle measurements, a deionized water drop is deposited onto the spincoated PMMA surface. Immediately after drop deposition, a picture can be taken with CAM 200 setup (KSV, NIMA, FL) to measure the contact angle using CAM 2008 associated software [Extrand et al (1994) *Polymer Engineering & Science* 34 390-94].

The term "powder or powdered material" as used herein refers to polymer powder and can be a single compound or a mix of different polymers and includes, but is not limited to, the group of PMMA, polystyrenes and their copolymers or block copolymers. Powder grain size is typically in the 25-100 µm range. The grain size can be mono- or polydisperse. The grain shape can be spherical, regular or irregular. As can be appreciated, the size and shape have an effect on the porosity of the material.

In the methods and device of the present invention it is the aim to use a hydrophilic particular materials, which requires to treatment in the regions forming the chambers and channels, whereas the particles forming the bulk of the device are treated with a hydrophobizing agent.

The embodiment wherein hydrophobic powder material is used which is rendered hydrophilic in the regions forming the channels and chamber is possible but less preferred.

"Depositing outlet" as used herein refers to a printhead nozzle or outlet or other deposition mechanism outlet. In the context of the present invention, the term depositing outlet typically refers to a deposition mechanism for depositing a printing liquid on a powder bed.

"Binder", "binding agent" or "sintering agent" as used herein is an agent suitable for binding the powder material and is comprised in the printing liquid. Typically, a binder is at least one organic solvent which is capable of at least partially dissolving the powder and which includes, but is not limited to, toluene, chlorinated solvents (such as for example but not limited to chloroform or dichlorobenze), ethyl lactate, ethyl acetate, dioxane, acetophenone, dichlorobenzene, dimethylformamide (DMF), tetrahydrofurane (THF), acetonitrile, hexane, ethanol, hexanol, hexyl acetate, or ketones (such as for example but not limited to acetone, acetophenone, butanone or pentanone), esters (such as for example but not limited to ethyl acetate, ethyl lactate, isopropyl acetate or hexyl acetate), dioxane, acetonitrile, or any combinations or mixtures thereof. A selection of different binders/binder classes has also been described in [Utela et al (2010) *J. Manuf. Sci. Eng* 132 011008].

The "printing liquid" as used herein refers to any liquid that is destined to be deposited on the powder bed, preferably via a depositing outlet. Printing liquids may comprise water, an organic or anorganic solvent, a binder, a reactant, a hydrophobizing agent, a hygroscopic compound or any combination of the previous. When hydrophobizing agents are added to the printing liquid, the printing liquid is referred to as hydrophibizing printing liquid.

"Reactants" as used herein refers, within the context of the present invention, to compounds for capturing and/or detecting analytes contained in the hydrophilic fluid sample applied to the printed microfluidic network. Reactants are preferably introduced in the microfluidic network by selectively depositing a printing liquid comprising the reactant at predetermined positions on the powder bed. Reactants include, but are not limited to, pH indicators, colored indicators, nucleic acid sequences or proteins like antibodies and enzymes.

"Hydrophobizing agents" as used herein refers, within the context of the present invention, to compounds which prevent a hydrophilic fluid to wick through predetermined sections in the microfluidic network to which the hydrophobizing agent was introduced, preferably by selectively depositing a printing liquid comprising the hydrophobizing agent on the powder bed, thus creating hydrophobic sections or walls surrounding sections enabling the capillary transport of hydrophilic fluids. Hydrophobizing agents as used herein include, but are not limited to, waxes, silanes, alkyl and alkenyl ketene dimers, acid anhydrides, including alkyl anhydrides and alkenyl succinic anhydride, hydrophobic polymers, hydrophobic particles, fluorinated molecules, or molecules containing apolar hydrocarbon moieties, or any combinations thereof.

A "hygroscopic compound" is a compound that readily absorbs water molecules from its environment by either absorption or adsorption and as used herein refers, within the context of the present invention, to compounds which increase the hydrophilicity of predetermined sections in the microfluidic network to which the hygroscopic agent was introduced, preferably by selectively depositing a printing liquid comprising the hygroscopic agent on the powder bed, thus increasing the flow speed of the capillary transport of the hydrophilic fluid in said predetermined sections. Hygroscopic compounds as used herein include, but are not limited to, ionic salts, sugars or polyethyleneglygols (PEGs).

Additionally, the surface tension and viscosity of the printing liquid mixture may be altered to match the printhead surface tension and viscosity requirements (10-70 dyn/cm and 8-30 cP, respectively) by adding surfactants like fatty alcohol ethoxylates and alkylphenol ethoxylates and high viscosity compounds such as polyethylene glycols, glycerol, and high alkanes, respectively.

Description

In a first object the present invention presents a method for three dimensional printing of a porous object, said object comprising hydrophobic sections delineating one or more sections enabling the capillary transport of hydrophilic fluids.

In a preferred embodiment of the present invention, said method involves the use of a print device comprising a powder bed plate, means for spreading a powder material on said powder bed plate in order to provide a powder bed within a defined area, one or more depositing outlets for depositing a printing liquid on said powder bed and means for repositioning said depositing outlets with respect to the surface of said powder bed, wherein said printing device allows for selectively depositing one or more printing liquids with varying compositions and physicochemical properties at predetermined positions on the powder bed; said method comprising the steps of: (a) providing one or more printing liquids wherein at least one printing liquid comprises a hydrophobizing agent, referred to as hydrophobizing printing liquid and at least one printing liquid comprises an agent suitable for binding the powder material of step (b), referred to as binder; (b) spreading a layer of a wettable powder material over said powder plate in order to create a powder bed; (c) depositing one or more of said printing liquids at predetermined positions on said powder bed, wherein the depositing of said printing liquid comprising a binder results in the binding of the powder particles at its depositing position and wherein the selective depositing of said hydrophobizing printing liquid on the powder bed provides for said hydrophobic sections of said porous object.

Typically, said selective depositing is controlled by a computing unit wherein said computing unit controls the movement of the depositing outlets relative to the powder bed and the timing and position of the deposition of a printing liquid on said powder bed from said depositing outlets, for example using computer readable data indicating said predetermined positions for selective deposition. Typically, said powder bed is a substantially horizontal powder bed which is largely, but not necessarily wholly horizontal. Substantially horizontal as used herein refers to horizontal to less than 10° from horizontal, more preferably from horizontal to less than 5° from horizontal. Said powder bed may however also be a powder bed with an oblique angle of more than 10° from horizontal.

In another preferred embodiment of the present invention, each of said one or more printing liquids has a different composition and said selective depositing of said one or more printing liquids at predetermined positions on the powder bed provides specific physical and/or chemical properties to different portions of said object.

The powder bed surface could also be altered by powder suction for creating cavities such as described in Glasschroeder et al (2015) *Rapid Prototyping Journal* 21 207-215.

In another preferred embodiment of the present invention, said hydrophobizing printing liquid comprises a hydrophobizing agent selected from the group comprising waxes, silanes, alkyl and alkenyl ketene dimers, acid anhydrides (such as but not limited to alkyl anhydrides and alkenyl succinic anhydride), hydrophobic polymers, hydrophobic particles, fluorinated molecules, molecules containing apolar hydrocarbon moieties and any combination thereof.

Preferably, said hydrophobizing printing liquid comprises a hydrophobizing agent selected from the group consisting of waxes, silanes, alkyl and alkenyl ketene dimers, acid anhydrides (including but not limited to alkyl anhydrides and alkenyl succinic anhydride), hydrophobic polymers, hydrophobic particles, fluorinated molecules, molecules containing apolar hydrocarbon moieties and any combination thereof. More preferably, said hydrophobizing printing liquid comprises a hydrophobizing agent selected from the group consisting of alkenyl succinic anhydrides, alkyl and alkenyl ketene dimers and waxes and any combinations thereof.

It is further preferred that said hydrophobizing printing liquid further comprises a binder. Typically, said binder is selected from the group comprising water, ketones (such as but not limited to acetophenone, hexanone, propanone, butanone, methylethylketone or pentanone), benzene, xylene, toluene, chlorinated solvents (such as but not limited to chloroform or dichlorobenzene), esters (such as but not limited to ethyl acetate, ethyl lactate, isopropyl acetate or hexyl acetate), dioxane, acetonitrile, dimethylformamide (DMF), ethylene dichloride, tetrahydrofurane (THF), alcohols (such as but not limited to ethanol, hexanol or phenol), cresols, fluorinated solvents, dimethylacetamide, lithium chloride, N-methylporpholine N-oxide, glycol ether, DMSO, salts or any combinations thereof. Preferably, said binder is selected from the group consisting of acetophenone, butanone, hexanone, propanone, methylethylketone, pentanone, toluene, chloroform, ethyl acetate and any combinations thereof. More preferably, said binder is selected from the group consisting of acetophenone, butanone, hexanone, propanone and any combinations thereof.

Typically, said print device comprises at least one outlet for depositing said at least one printing liquid on said powder bed and wherein each of the at least one respective printing liquids is deposited on the powder bed from a different depositing outlet. Preferably, said print device comprises at least one outlet for depositing printing liquids, for example at least one, 2, 3, 4, 5 or more outlets for depositing printing liquids.

The powder material used in the method of the present invention typically comprises an organic and/or an inorganic particulate material having a particle size varying between 1 µm and 250 µm. More preferably, said particulate material has a particle size of at least 1 µm, for instance at least 1, 10, 25, 50, 75, 100, 125, 150, 175, 200 or at least 225 µm. It is further preferred that said particulate material has a particle size of not more than 250 µm, for instance not more than 50, 75, 100, 125, 150, 175, 200, 225 or not more than 250 µm. Even more preferably, said particulate material has a particle size of about 25 µm to 100 µm, such as of about 25 µm, 35 µm, 45 µm, 55 µm, 65 µm, 75 µm, 85 µm, 95 µm or 100 µm.

In the methods of the present invention the particulate matter is applied as a dry powder, not as a suspension. After deposition of the powder liquids are added on the deposited powder such as the binding liquid, hydrophobizing agents, and reagents (such as enzymes, antibodies), as described in more detail in the present applications. Reagents such as buffers and proteins may deposited allowing transport with the hydrophilic fluid upon use. Alternatively, reagents such as antibodies are immobilized to allow a sandwich assay, or chromophoric enzymatic substrates are added to determine enzyme activity.

In another preferred embodiment of the present invention, said powder material comprises a polymer and said binder is a solvent for said polymer (Table 1). Typically, said polymer is selected from the group comprising polymethyl methylacrylate (PMMA), acrylonitrile butadiene styrene (ABS), poly lactic acid (PLA), poly styrene (PS), poly vinyl alcohol (PVA), nylon, cellulose, nitrocellulose, cellophane, and their copolymers or block copolymers. Preferably, said polymer is selected from the group consisting of PMMA and PS and their copolymers or block copolymers.

TABLE 1

Polymers and examples of applicable binder solvents.

| Polymer | Solvent |
| --- | --- |
| PMMA (polymethyl methylacrylate | Ketones (such as acetophenone, butanone, pentanone, hexanone, propanone), toluene, chloroform, ethyl acetate, dioxane, ethyl lactate, isopropyl acetate, acetonitrile, dichlorobenzene, hexyl acetate. |
| PS (polystyrene) | Chlorinated solvents, ketones, toluene, benzene, xylene, dimethylformamide (DMF). |
| ABS (acrylonitrile butadiene styrene) | Esters, ketones, tetrahydrofurane (THF), ethylenedichloride. |
| PVA (poly vinyl alcohol) | Water, dimethylsulfoxide (DMSO), DMF (between 70 to 140° C.), alcohol. |
| PLA (poly lactic acid) | THF, dioxane, chlorinated/fluorinated solvents, benzene (between 50 to 70° C.). |
| Cellulose | DMF/Dimethylacetamide in combination with lithium chloride, N-Methylmorpholine N-oxide. |
| Nitrocellulose | Alcohols, esters, ketones and glycol ethers. |
| Cellophane | Water, DMSO in combination with salts. |
| Nylon | DMF, phenol, cresols. |

Typically, said binder is selected from the group comprising water, ketones (such as but not limited to acetophenone, hexanone, propanone, butanone, methylethylketone or pentanone), benzene, xylene, toluene, chlorinated solvents (such as but not limited to chloroform or dichlorobenzene), esters (such as but not limited to ethyl acetate, ethyl lactate, isopropyl acetate or hexyl acetate), dioxane, acetonitrile, dimethylformamide (DMF), ethylene dichloride, tetrahydrofurane (THF), alcohols (such as but not limited to ethanol, hexanol or phenol), cresols, fluorinated solvents, dimethylacetamide, lithium chloride, N-methylporpholine N-oxide, glycol ether, DMSO, salts or any combinations thereof. Preferably, said binder is selected from the group consisting of acetophenone, butanone, hexanone, propanone, methylethylketone, pentanone, toluene, chloroform, ethyl acetate and any combinations thereof. More preferably, said binder is selected from the group consisting of acetophenone, butanone, hexanone, propanone and any combinations thereof.

Preferably, said powder material comprises a polymer, wherein said polymer is polymethyl methacrylate (PMMA) and wherein said binder is selected from the group consisting of acetophenone, butanone, propanone, hexanone and any combinations or mixtures thereof.

Said binding agent may alternatively also polymerize the powder material or initiate a polymerization to form bonds.

In another preferred embodiment of the present invention, said method of the present invention involves the use of said print device, wherein said print device is a 3D printing device comprising means for lowering said powder bed plate and wherein said method comprises in addition to steps (a), (b) and (c) of the first embodiment of the present invention, the additional steps of (d) lowering the powder bed; and (e) repeating steps (c) and (d) until the object is formed, whereby at each repetition of step (c) an additional layer of the porous object is formed and wherein at least part of the powder material of the powder bed is bound to bound material of the layer formed in the previous step (c) wherein said binding of layers results from the directed depositing of said printing liquid comprising said binder, and wherein said object comprises at least one section that is accessible for applying a hydrophilic fluid sample and that enables capillary transport of hydrophilic fluids.

Typically, said section for applying a hydrophilic fluid sample connects with an internal section of said object enabling capillary transport of hydrophilic fluids. The method according to the present invention may be used for printing a porous object wherein said sections of said porous object enabling capillary transport of hydrophilic fluids are interconnected in a microfluidic network suitable for the capillary transport along a predefined path of a hydrophilic fluid sample applied on said at least one accessible dedicated section of said object, said dedicated section being part of said microfluidic network.

In the devices of the present invention, the hydrophilic particulate material remains present in the regions forming the channels and/or chamber for capillary transport. The powder material is present herein as stacked balls with cavities inbetween them. When binding agent is used, the particulate material form a cluster of interconnected particles with inbetween them a network of cavities, allowing a capillary flow.

Compared to prior art devices wherein "empty" channels are formed, the presence of particulate matter within the channel generates more interaction between fluid and particles. Accordingly when the particles are coated with a reagent, the interaction between an analyte in a sample and a reagent on a particle will be more efficient that in a channel wherein only the surface of the cylindrical channel is coated with a reagent.

The presence of the particles within a channel also allows the manipulation of fluids beyond the mere capillary action of the fluid. For example the particles in a region of a channel can be pretreated with e.g. a surfactant such as Tween™ acting as a plug, which temporarily delays the flow of the fluid. This allows for example that an chemical reaction can be performed at a certain place for a predetermined period. This concept has been already published by Chen et al. (2012) Lab Chip. 12, 2909-2913 and can be introduced in this type of devices which are prepared without sintering, or high temperature treatment.

Said at least one dedicated section of said object for applying a hydrophilic fluid sample may consist of unbound material, partially bound material or unbound material.

It is preferred that the external surfaces which do not contain said at least one dedicated section for applying a hydrophilic fluid sample of said printed porous 3D object consist of bound material. Such bound external surfaces can be obtained when during the printing of said object a printing liquid comprising a binder is deposited on the powder surfaces that are destined to become part of said external surface of said 3D object. The internal part of such object, i.e. the part of the object enclosed by said bound external surfaces, or said at least one dedicated section for applying a hydrophilic fluid sample, may comprise sections containing unbound or partially bound powder material.

Preferably, said microfluidic network comprises microfluidic chambers and/or channels. More preferably, said microfluidic chambers and/or channels have a height of about 100 µm to about 10000 µm, for example of at least 100 µm and not more than 10000 µm, e.g. of 100 µm to 1000 µm, 1000 µm to 2000 µm, 2000 µm to 3000 µm, 3000 µm to 4000 µm, 4000 µm to 5000 µm, 5000 µm to 6000 µm, 6000 µm to 7000 µm, 7000 µm to 8000 µm, 8000 µm to 9000 µm, 9000 µm to 10000 µm. Even more preferably, said microfluidic chambers and/or channels have a height of about 100 µm to about 4000 µm.

Preferably, said microfluidic chambers and/or channels have a width of about 100 to about 10000 µm, for example of at least 100 µm and not more than 10000 µm, e.g. of 100 µm to 1000 µm, 1000 µm to 2000 µm, 2000 µm to 3000 µm, 3000 µm to 4000 µm, 4000 µm to 5000 µm, 5000 µm to 6000 µm, 6000 µm to 7000 µm, 7000 µm to 8000 µm, 8000 µm to 9000 µm, 9000 µm to 10000 µm. Even more preferably, said microfluidic chambers and/or channels have a width of about 100 µm to about 4000 µm.

Preferably, said microfluidic network comprises zones comprising compounds for capturing and/or detecting analytes contained in said hydrophilic fluid sample applied on said at least one dedicated section, wherein said compounds for analyte detection and/or capture are introduced in said network by selectively depositing a printing liquid comprising said compound for analyte detection and/or capture at predetermined positions on said powder bed.

Said compounds may be immobilized by a covalent bond of said compound to the printed powder. Said compounds may also not be covalently bound to the printed powder which enables the compound to mobilize through the microfluidic network in the hydrophilic fluid.

Said analyte capturing or detection compound may be for example, but is not limited to, a pH indicator, an antibody (such as but not limited to a labeled antibody or tagged antibody), a DNA molecule, a RNA molecule, an enzyme, an enzyme substrate, a color indicator, an enzyme cofactor, an enzyme inhibitor, an antibody-enzyme conjugate, a chemical reactant, or a buffer.

Preferably, said analyte detection compound is selected from the group consisting of a pH indicator, a color indicator, an antibody, DNA molecule, a RNA molecule, an enzyme, an enzyme substrate, a color indicator, an enzyme cofactor, an enzyme inhibitor, an antibody-enzyme conjugate, a labeled antibody, a chemical reactant and a buffer.

Said microfluidic network may also comprise zones for controlling the flow rate of the hydrophilic liquid in said network.

Said zones may for example be off-channel reservoirs or channels that need to be filled before the hydrophilic fluid sample continues in the microfluidic network channel direction, because of which the flow of the hydrophilic fluid in the channel network is delayed.

Said zones may also be partially hydrophobic zones created by depositing a partially hydrophobizing printing liquid comprising a binder resulting in the binding of the powder particles at said zone and wherein the selective depositing of the partially hydrophobizing printing liquid on the powder bed provides for said partially hydrophobic zones of said porous object, and wherein said partially hydrophobic zones control or delay the flow of the hydrophilic fluid sample in said network.

Said zones may also comprise compounds or elements that act as triggers or timers to control the flow or the flow rate of the hydrophilic fluid through said network, wherein said compounds for flow or flow rate control are introduced in said network by selectively depositing a printing liquid comprising said compound for flow or flow rate control at predetermined positions on said powder bed. Said compound may for example be a hydrophobic compound, such as hydrophobic boronic esters that are printed into a defined hydrophilic section of the network creating a blocking section which blocks the advancement of the hydrophilic fluid through the network, and wherein said hydrophobic compound decomposes into hydrophilic fragments upon contact with a decomposing molecule, such as H2O2, therefore degrading the blocking section and allowing the hydrophilic fluid to further advance through the network [Lewis et al (2013) *Macromolecules* 46 5177-83; Lewis et al (2012) *Angewandte Chemie International Edition* 51 12707-10].

Said zones may also comprise amended pore size or porosity for example created by depositing a printing liquid comprising a binder with a different sintering rate, wherein said zones with modified pore size or porosity control, fasten or delay the flow of the hydrophilic fluid sample in said microfluidic network.

In a preferred embodiment of the present invention, said porous object is a device for liquid handling.

In another preferred embodiment of the present invention, said porous object is a point of care diagnostic device wherein said device comprises a read-out section that is part of said microfluidic network and that is adapted to provide a signal depending on either the presence, absence or concentration of an analyte in a hydrophilic fluid sample applied on said dedicated section.

In a second object, the present invention presents a porous object comprising hydrophobic sections delineating one or more sections enabling the capillary transport of hydrophilic fluids prepared by three-dimensional printing according to the method of any one of the embodiments of the first object of the present invention.

In a preferred embodiment of the present invention, said object is a liquid handling device.

In another preferred embodiment of the present invention, said object is a point of care diagnostic device.

EXAMPLES

Example 1

3D Printing of a Porous Object Containing a Microfluidic Network Comprising a Channel Allowing Capillary Transport of Hydrophilic Fluids With Hydrophobic Walls The combination of a roller and a scraper blade allows powder spreading onto the printing bed. The roller rotates in the direction opposite to the spreading direction. A printout support layer composed of loose powder is created by spreading about 5 to about 20 homogeneous and dry powder layers of about 10-200 µm thickness. In between each layer deposition, the printing bed is lowered by one layer thickness. However, thicker supports are also possible.

Figure 1:
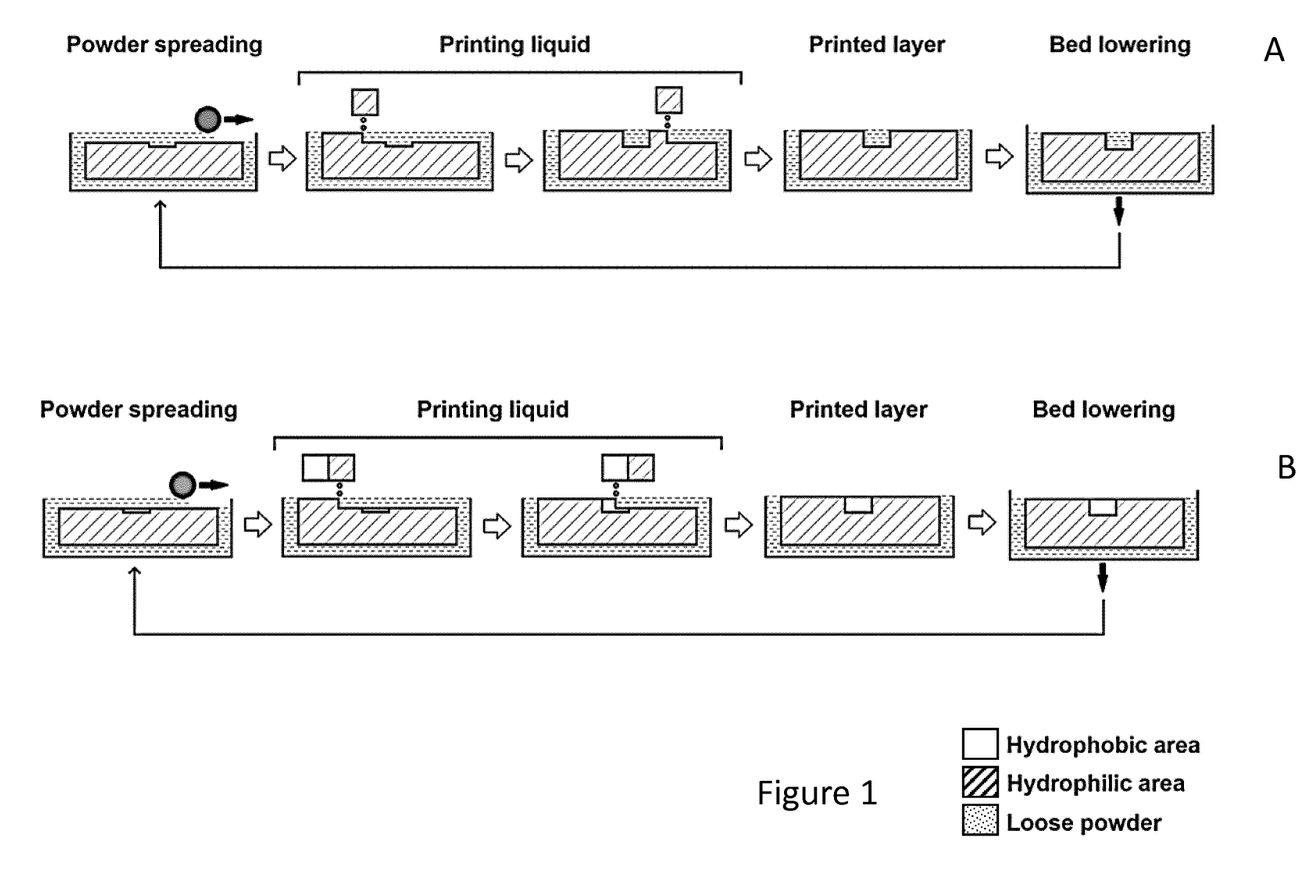
FIG. 1 shows a schematic overview of different steps of the 3D printing process of a porous object containing a microfluidic network comprising hydrophobic areas delineating channels or areas allowing capillary transport of hydrophilic fluid samples ("hydrophilic area" (FIG. 1A) or "loose powder" (FIG. 1B)).

At the start of the printing process, another homogeneous and dry powder layer is deposited onto the printout support layer ("powder spreading" or step 1, FIG. 1). The roller rotation direction remains opposite to the spreading direction. Layer thickness is about 10-200 µm.

Inkjet printheads allow printing liquid deposition onto the previously deposited layer. The jetted drop volume is about 5 to about 100 pL. Printing liquid is deposited on the powder layer within an area determined by a digital computer model of the object to be printed. Printing liquids comprising a binder combined with or in absence of an hydrophobizing agent are respectively deposited onto predetermined positions or areas of the powder bed, matching object sections labelled in said computer model as "hydrophobic area" and "hydrophilic area", respectively ("binder printing" or step 2, FIG. 1A). Alternatively, in step 2, a printing liquid comprising a binder combined with a hydrophobizing agent is deposited onto a predetermined "hydrophobic area" of the powder bed, whereas no printing liquid is deposited onto a predetermined "loose powder" area of the powder bed (FIG. 1B). Said "loose powder" area also allows capillary transport of hydrophilic fluids through said "loose powder" channel with hydrophobic walls. Alternatively, in step 2, a printing liquid comprising a binder combined with a hydrophobizing agent, or a printing liquid in the absence of a binder but combined with a hydrophobizing agent, may be deposited onto a predetermined "hydrophobic area" of the powder bed; and/or a printing liquid comprising a binder in the absence of a hydrophobizing agent, or a printing liquid in the absence of a binder and a hydrophobizing agent, may be deposited onto a predetermined "hydrophilic area"; and/or no printing liquid may be deposited onto a predetermined "loose powder" area of the powder bed.

The inkjetted printing liquid comprising a binder is allowed to spread in between the powder layer grains via capillarity forces. The polymer grain surfaces are partially softened and dissolved by binder. Upon evaporation of the binder solvent fraction, the powder particles sinter together. The result is a porous network of connected particles in the area where binder was deposited. Hydrophobizing agent present in the hydrophobizing printing liquid remains onto the powder grain surface, resulting in a porous network with internal hydrophobic surfaces ("printed layer" or step 3, FIGS. 1A and B).

The printing bed is then lowered by one layer thickness, between about 10 and 200 µm ("bed lowering" or step 4, FIGS. 1A and B).

Figure 2:
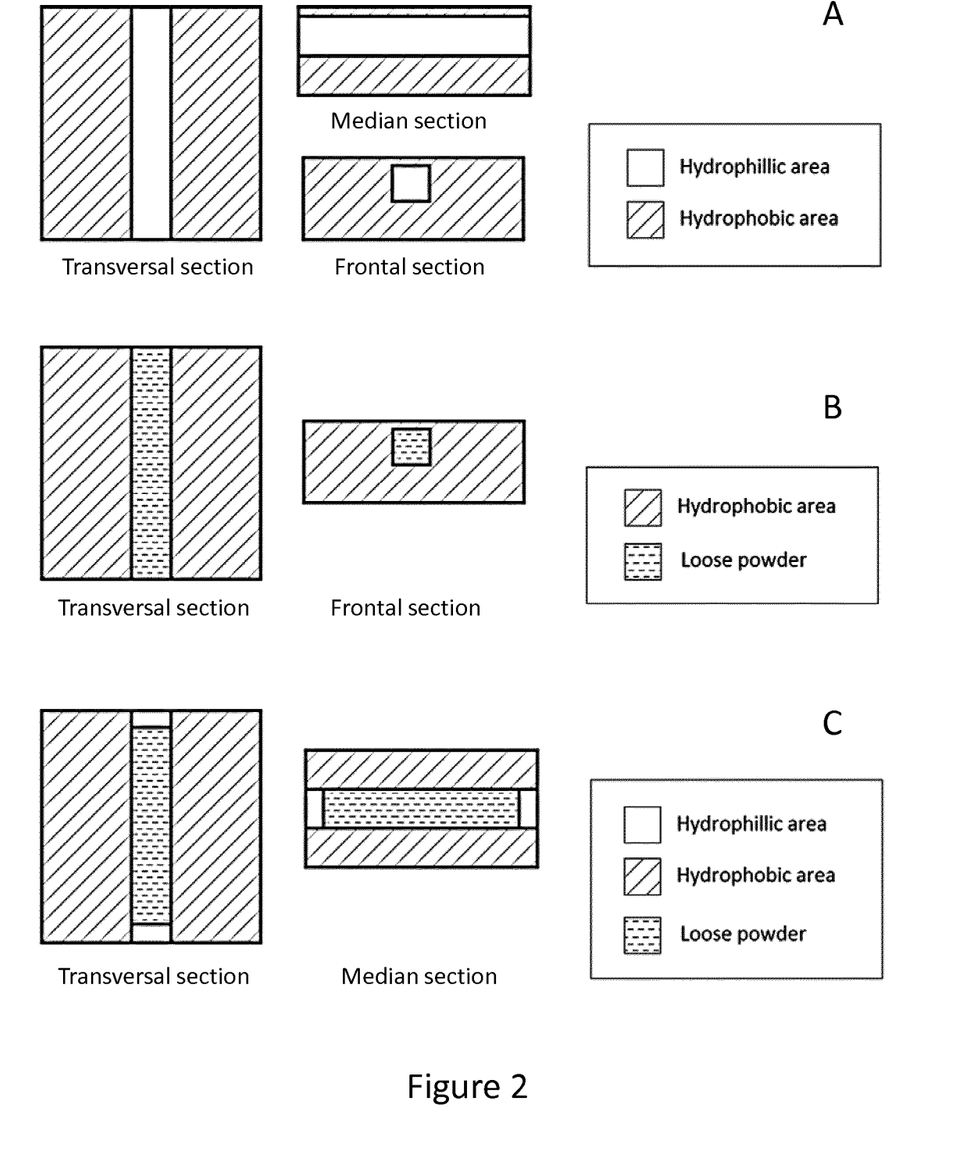
FIG. 2 shows a schematic overview of different sections of a 3D printed porous object containing a microfluidic network comprising hydrophobic areas delineating channels or areas allowing capillary transport of hydrophilic fluid samples, wherein this area can comprise a "hydrophilic area" (FIG. 2A), a "loose powder" area (FIG. 2B), or a combination of a "loose powder" area and a "hydrophilic area" in which the "hydrophilic area" can be connected to or adjacent to the "loose powder" area (FIG. 2C).

Previously described steps 1, 2, 3 and 4 (FIGS. 1A and B) are repeated until all predefined object sections from the computer model have been translated into a corresponding printed powder layer. During this process, printing liquid inkjetted onto the top layer spreads to previously sintered layers, resulting in the bonding of these layers and eventually a porous 3D object with precise control over the "hydrophilic" and/or "hydrophobic" and/or "loose powder" functionalization of both internal and external sections of said 3D object (FIGS. 2A, B and C).

After printing completion, the powder bed can be heated to improve solvent residue evaporation. This step is usually performed at about 65° C. for allowing quick solvent evaporation. However, any temperature between about 20 to 65° C. is suitable for solvent evaporation, depending on the composition of the printing liquid components (e.g. temperatures between about 20 to 40° C. are used when using printing liquids comprising sensitive reactants, such as antibodies). After printing, printouts can be placed at 80° C. for 1 hr for allowing the hydrophobizing agent to quickly cure (i.e. be activated). However, printouts can also be incubated at room temperature for 4 to 7 days to allow curing at room temperature.

The methods of the present invention thus allow to prepare devices for liquid handling without sintering. The main reason for a drying step is to evaporate solvents used as binder agent or used as hydrophobizing agent. The use of temperatures below 65° C., below 40° C., or at room temperature between 20 and 25° C.) allows the use of heat sensitive particulate material as well as heat sensitive reagents such as proteins.

Example 2

3D Printing of a Porous Object Containing a Microfluidic Network Comprising a Channel Allowing Capillary Transport of Hydrophilic Fluids With Unsintered Channels With Hydrophilic Caps and Hydrophobic Walls (FIG. 2C)

When in step 2 of EXAMPLE 1, a printing liquid comprising a binder combined with a hydrophobizing agent is deposited onto a predetermined "hydrophobic area" of the powder bed, and a printing liquid comprising a binder in the absence of a hydrophobizing agent is deposited onto a predetermined "hydrophilic area", and no printing liquid is deposited onto a predetermined "loose powder" area of the powder bed, a porous object is printing containing a microfluidic network comprising channels, allowing capillary transport of hydrophilic fluids, which are either containing loose powder (unsintered channels), or can be bound (hydrophilic areas), and wherein the unsintered channels are connected/adjacent to the hydrophilic areas (hydrophilic caps) (FIG. 2C).

Example 3

Figure 3:
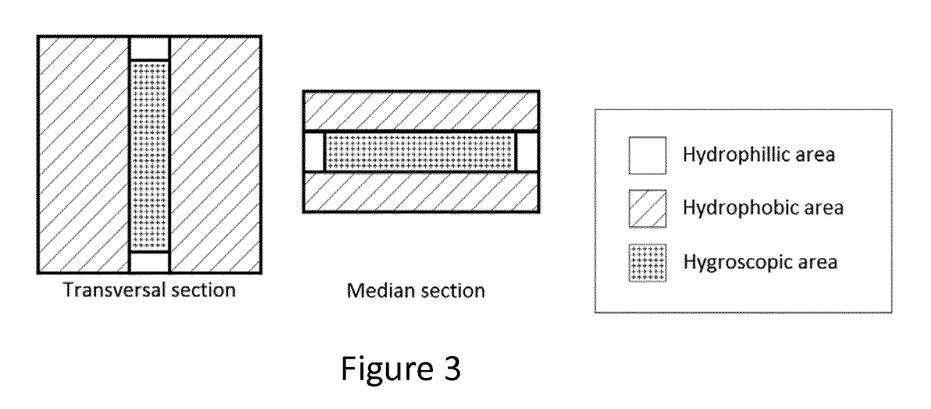
FIG. 3 shows a schematic overview of different sections of a 3D printed porous object containing a microfluidic network comprising hydrophobic areas delineating channels or areas allowing capillary transport of hydrophilic fluid samples wherein this area can comprise a "hydrophilic area" and a "hygroscopic area" in which the "hydrophilic area" can be connected to or adjacent to the "hygroscopic area".

3D Printing of a Porous Object Containing a Microfluidic Network Comprising a Channel Allowing Capillary Transport of Hydrophilic Fluids With a Hygroscopic Area and Hydrophobic Walls (FIG. 3)

The procedure remains identical as described in EXAMPLE 1, with the addition of an extra functional printing liquid comprising an additional functional component. When in step 2 of EXAMPLE 1, a printing liquid comprising a binder in absence of a hydrophobic agent is deposited onto a predetermined "hydrophilic area", and a printing liquid comprising a hydrophobic agent and a binder is deposited onto a predetermined "hydrophobic area" and a printing liquid comprising a binder and an hygroscopic component in absence of a hydrophobic agent is deposited onto a predetermined "hygroscopic area", a porous object is printed containing a microfluidic network comprising channels allowing capillary transport of hydrophilic fluids which are bound (hydrophilic areas) and may contain a hygroscopic component which can increase the flow speed of the capillary transport of the hydrophilic fluid in said predetermined hygroscopic sections (FIG. 3).

Example 4

Figure 4:
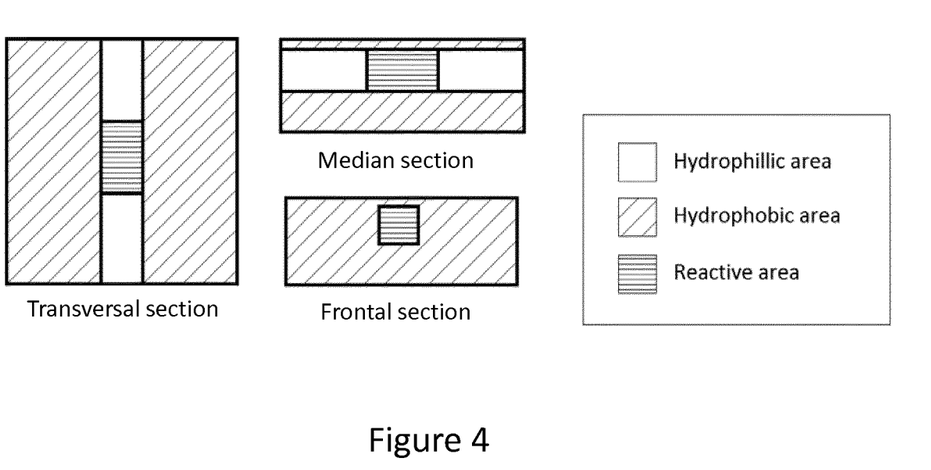
FIG. 4 shows a schematic overview of different sections of a 3D printed porous object containing a microfluidic network comprising hydrophobic areas delineating channels or areas allowing capillary transport of hydrophilic fluid samples wherein this area can comprise a "hydrophilic area" and a "reactive area" in which the "reactive area" can be connected to or adjacent to the "hydrophilic" area.

3D Printing of a Porous Object Containing a Microfluidic Network Comprising a Channel Allowing Capillary Transport of Hydrophilic Fluids With Reactive Area and Hydrophobic Walls (FIG. 4)

The procedure remains identical as described in EXAMPLE 1, with the addition of an extra functional printing liquid comprising an additional functional component. When in step 2 of EXAMPLE 1, a printing liquid comprising a binder in absence of a hydrophobic agent is deposited onto a predetermined "hydrophilic area", and a printing liquid comprising a hydrophobic agent and a binder is deposited onto a predetermined "hydrophobic area", and a printing liquid whether in the presence or absence of a binder but in the absence of a hydrophobic agent, comprises an additional reactive component is deposited onto a predetermined "reactive area", a porous object is printed containing a microfluidic network comprising channels allowing capillary transport of hydrophilic fluids which are either bound (hydrophilic areas) and/or may contain a reactive component which allows for capturing and/or detecting analytes contained in the hydrophilic fluid sample in said predetermined reactive sections (FIG. 4).

Alternatively, said reactive area may be printed by "in situ mixing", in which a printing liquid comprising the reactive component in the absence of a binder or a hydrophobic agent is printed onto the predetermined reactive area, and a printing liquid comprising a binder in the absence of a hydrophobic agent is printed on the same predetermined area, but in which both printing liquids are printed from a different print head.

Example 5

3D Printing of a pH Reactive Microfluidic Network 3D printing device: For the purpose of this example a Projet™ 660 pro (3D Systems, Rock Hill, USA) 3D printing was used, which comprises multiple exchangeable printing heads, wherein each printing head corresponds to a printing liquid reservoir operationally connected to an outlet channel for depositing this printing liquid on the powder bed.

Powder: The powder material used in the printing of the 3D object according to this example was Poly(methyl methacrylate) (PMMA) powder (grain size: 30-40 μm).

Printing liquids: Following mixtures of organic solvents were found suitable for sintering PMMA: acetophenone/acetone, acetophenone/butanone and acetophenone/propanone. By appropriately mixing these solvent combinations, printing liquids with binder properties were obtained having suitable viscosity and surface tension for use in the printing heads of the Projet™ 660 pro 3D printing device. For example, mixing acetophenone and acetone between a 1/1 to a 2/1 ratio provided a suitable printing liquid for binding the PMMA powder without conferring hydrophobic properties to the bound powder section ("hydrophilic binder"). A printing liquid with both binding and hydrophobizing properties was provided by adding between 0.5 g to 1 g of N-Octadecylsuccinic acid anhydride (hydrophobizing agent) per 50 ml of any of the preceding organic solvent mixtures, for example by adding 1 g of N-Octadecylsuccinic acid anhydride per 50 ml to a mixture of acetophenone and acetone in equal volumes ("hydrophobic binder"). For conferring pH sensing properties to sections of the 3D printed object according to this example, a printing liquid comprising Methyl Orange was used. This printing liquid was produced by preparing a saturated solution of Methyl Orange in 50 mL of MilliQ™ water, which was subsequently mixed with 3.1 mL of Glycerol and 250 μL of Surfactant (Surfynol 465) ("pH indicator printing liquid"). Preparation of the digital model guiding the 3D printing: A digital 3D representation of a 42×42×2 mm plate containing a 3D flow channel with reactive areas was created using AutoCAD™ and exported as .stl file. Then, sections of said 3D representation were colored using Blender™ (www.blender.org) as follows: white=hydrophilic section, such as hydrophilic channel or chamber, yellow (grey contour line in FIG. 5, left picture)=section destined to comprise the pH indicator (Methyl Orange), black=hydrophobic sections. The obtained file was subsequently saved with a .wrl extension. Cyan text (light grey letters "PLACE SAMPLE HERE", RED: ACIDIC", "YELLOW: BASIC" in FIG. 5 left picture) was inputted onto device top face (as basic instruction for use) using 3D Software.

Printer setup: 3D printer (Projet™ 660 pro) is loaded with PMMA powder. The Clear printhead of this system was replaced with a custom printhead loaded with said printing liquid comprising a binder without hydrophobic agent ("hydrophilic binder", to be deposited on a predetermined "hydrophilic area"). This printhead was used for depositing the hydrophilic binder on the sections of the powder bed corresponding to the sections in the 3D digital representations indicated in white (FIG. 5, white area in left picture and hydrophilic portion of the device in the right picture).

Figure 5:
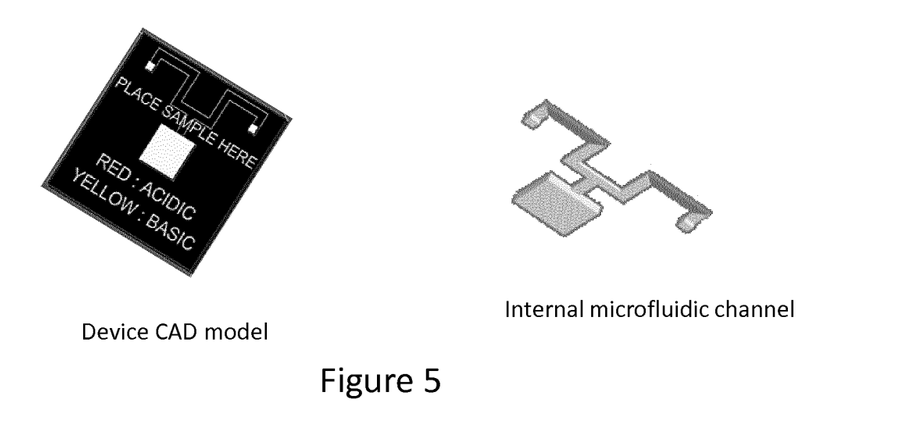

The Black binder printhead was replaced was replaced with a custom printhead loaded with a printing liquid comprising a binder combined with an hydrophobic agent ("hydrophobic binder", to be deposited on the predetermined "hydrophobic area"). This printhead was used for depositing the hydrophobic binder on the sections of the powder bed corresponding to the sections in the 3D digital representations indicated in black (FIG. 5, left panel).

The Yellow binder printhead was replaced with custom printhead loaded with said printing liquid comprising a printing liquid comprising the pH indicator Methyl Orange ("pH indicator printing liquid", to be deposited on the predetermined "reactive area"). This printhead was used for depositing the pH indicator printing liquid on the sections of the powder bed corresponding to the sections in the 3D digital representations indicated in FIG. 5, right panel.

The Cyan binder printhead was kept unchanged (prints blue commercial aqueous printing liquid).

Printing parameters were: 100 μm as layer thickness of powder material and 100% as binder saturation.

3D printing process: Following the start of the printing process, the 3D printing device selectively deposits the respective printing liquids onto the powder bed corresponding to the printing instructions contained in the 3D digital representation: (a) Sections on which the hydrophilic binder is deposited, provide the hydrophilic areas which allow hydrophilic fluid sample transport; (b) Sections on which the pH indicator printing liquid is deposited provide pH sensitive reactive zones ("reactive area") of the object, and may comprise unbound powder, which allow hydrophilic fluid sample transport; and (c) Sections bound with the hydrophobic binder enclosing and/or delineating said hydrophilic and pH sensitive zones ("hydrophobic area") which do not allow hydrophilic fluid sample transport.

Figure 6:
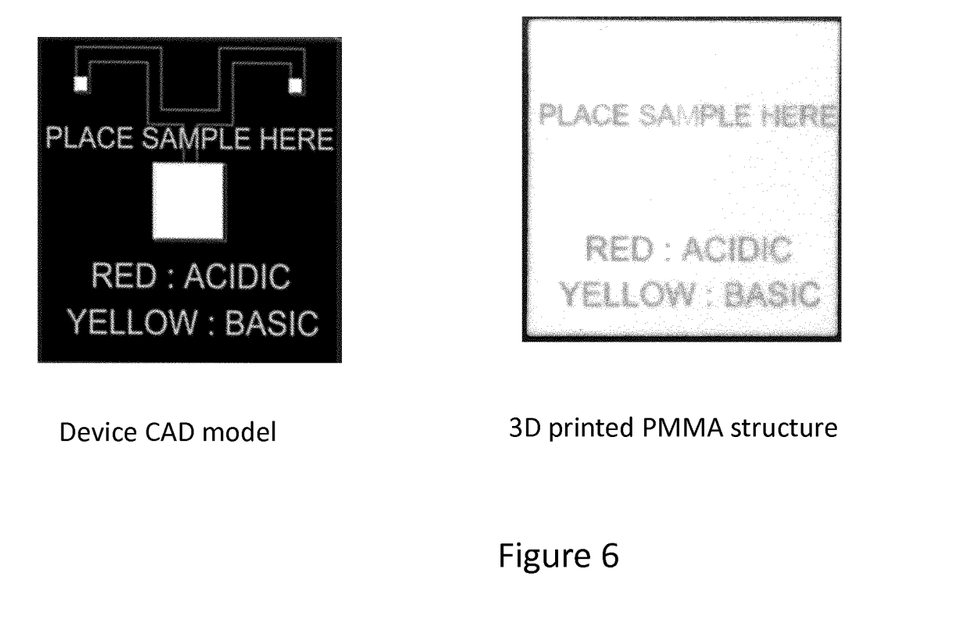
FIG. 6 shows the device CAD model of the digital 3D representation of pH reactive microfluidic network (left) and the resulting PMMA 3D printed object (right).

Post-processing: After termination of the drying step, the part is manually removed from the powder bed, brushed for removing last traces of unsintered powder. Thereafter the printed object is ready for use (FIG. 6, right picture).

Figure 7:
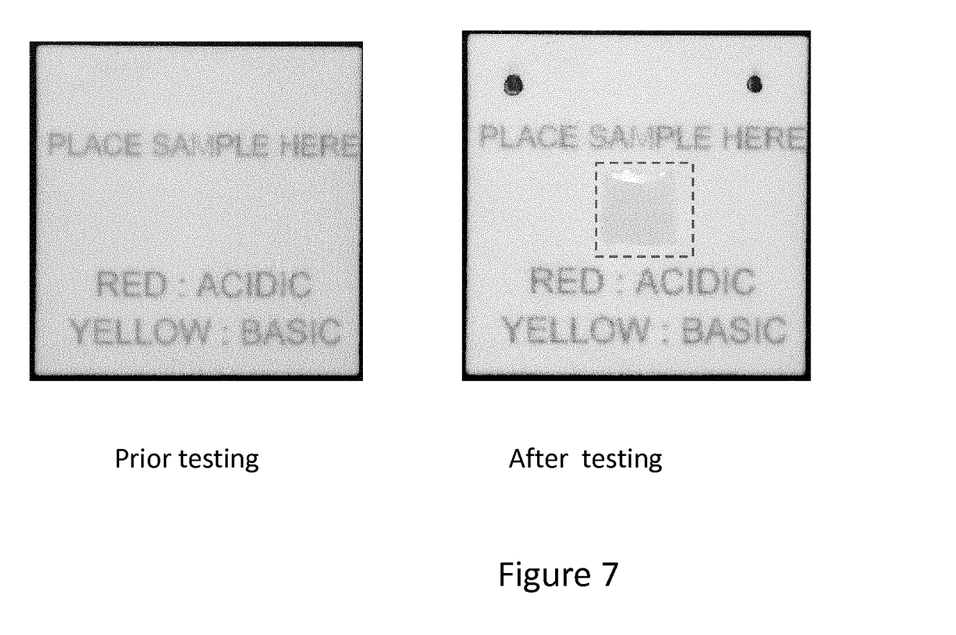
FIG. 7 shows the resulting 3D printed object before (left) and after sample deposition and test completion (right). (the region where the sample is added is indicated by a dashed square).
Figure 8:
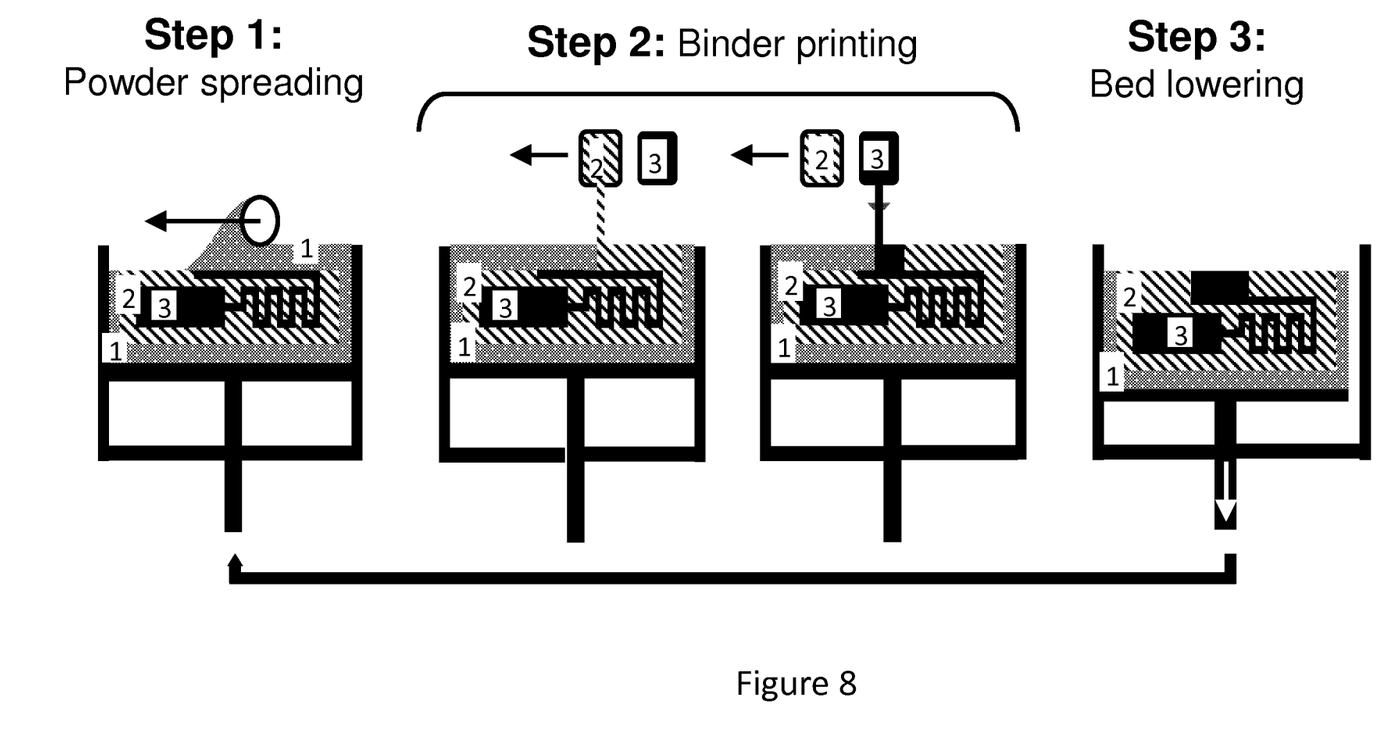
FIG. 8 shows a schematic overview of an embodiment of the printing process wherein during the process a powder layer (1) is spread on the top of early printed layers (step 1). The powder is treated with binder and hydrophobising agent (2) and with binder without hydrophobizing agent (i.e. hydrophilic (3)) (step 2). This results in at the one hand particles bound by binder surrounded by hydrophobic material and at the other hand particle bound by binder surrounded by a hydrophilic environment. In step 3, the bed is lowered to receive a further layer of powder.

Characterization: The 3D printed porous object is tested by depositing an acidic aqueous sample (pH=2) on the hydrophilic sample pad (section for applying a hydrophilic fluid sample, central square FIG. 7, (rectangle with dotted line added to indicate). Color change on readout sections/pads is noticed after a few minutes (formation of colored squares in the upper left and right angle) (FIG. 7).

The invention claimed is:

1. A method for three-dimensional printing of a porous device for liquid handling, the porous device comprising hydrophobic sections delineating one or more interconnected chambers and/or channels enabling the capillary transport of hydrophilic fluids, the method being a method without sintering and comprising:
   (a) providing a printing device comprising:
       means for spreading a dry powder of a particulate material on a powder bed surface,
       one or more depositing outlets for depositing at least one printing liquid on the powder bed surface,
       a computing unit that controls movement of the depositing outlets relative to the powder bed surface, wherein the printing device allows for selectively depositing one or more printing liquids on the powder bed and,
       a printing liquid comprising a hydrophobizing agent and a binder agent suitable for binding powder material;
   (b) spreading a layer of dry powder of a particulate material over a powder plate in order to create a powder bed;
   (c) depositing the printing liquid at predetermined positions on the powder bed, thereby binding the powder particles and providing hydrophobic sections on the powder particles;
   (d) lowering the powder bed and spreading an additional layer of dry powder of the particulate material, wherein the dry powder is applied on the underlying layer obtained in (c); and
   (e) repeating (c) and (d) until the porous device is formed, whereby at each repetition of (c) an additional layer of the porous device is formed and wherein at least part of the powder of the particulate material of the powder bed is bound to bound material of the layer formed in (c);

wherein the binding of layers results from the directed depositing of the binder agent, and the depositing of the hydrophobizing agent results in delineating one or more interconnected chambers and/or channels within the hydrophobic sections, whereby the chambers and/or channels are filled with a hydrophilic particulate material enabling capillary transport of hydrophilic fluids in between the hydrophilic particulate material.

2. The method according to claim 1, further comprising selectively depositing an additional printing liquid comprising a compound for capturing and/or detecting an analyte in a dedicated zone of the channels and/or chambers.

3. The method according to claim 2, wherein the compound for capturing and/or detecting an analyte is selected from the group consisting of an antibody, a DNA molecule, a RNA molecule, an enzyme, an enzyme substrate, a color indicator, an enzyme cofactor, an enzyme inhibitor, an antibody-enzyme conjugate, a labeled antibody, and a chemical reactant.

4. The method of claim 1, wherein the printing liquid further comprises a solvent, and the method further comprises drying the porous device to remove the solvent at a temperature of at most 40° C.

5. The method according to claim 1, wherein the hydrophobizing agent is selected from the group consisting of waxes, silanes, alkyl and alkenyl ketene dimers, acid anhydrides, hydrophobic polymers, hydrophobic particles, fluorinated molecules, molecules containing apolar hydrocarbon moieties, and combinations thereof.

6. The method according to claim 1, wherein the binder agent is selected from the group consisting of acetophenone, butanone, hexanone, propanone, methylethylketone, pentanone, toluene, chloroform, ethyl acetate, and combinations thereof.

7. The method according to claim 1, wherein the printing device further comprises at least one additional printing liquid, and wherein different printing liquids are deposited on the powder bed from different depositing outlets.

8. The method according to claim 1, wherein the dry powder material comprises an organic and/or an inorganic particulate material having a particle size varying between 1 µm and 250 µm.

9. The method according to claim 1, wherein the dry powder material comprises a polymer and wherein the binder agent is a solvent for the polymer.

10. The method according to claim 9, wherein the polymer is polymethyl methacrylate, and wherein the binder agent is selected from the group consisting of acetophenone, butanone, propanone, hexanone, and combinations thereof.

11. The method according to claim 1, wherein the channels and/or chambers have a height of about 100 µm to about 10000 µm.

12. The method according to claim 1, wherein the channels and/or chambers have a width of about 100 µm to about 10000 µm.

* * * * *

UNITED STATES PATENT AND TRADEMARK OFFICE
CERTIFICATE OF CORRECTION

| | | |
|---|---|---|
| PATENT NO. | : 11,685,113 B2 | |
| APPLICATION NO. | : 16/491478 | |
| DATED | : June 27, 2023 | |
| INVENTOR(S) | : Rob Ameloot and Clement Achille | |

It is certified that error appears in the above-identified patent and that said Letters Patent is hereby corrected as shown below:

On the Title Page

Item (74), attorney, agent, or firm, delete "DINSMORE & SHOHL, LLP" and insert --DINSMORE & SHOHL LLP--, therefor.

In the Specification

In Column 2, Line 26, delete "hydrophic" and insert --hydrophobic--, therefor.

In Column 11, Line 57, delete "anorganic" and insert --inorganic--, therefor.

In Column 14, Line 27, delete "may deposited" and insert --may be deposited--, therefor.

In Column 15, Line 65, after "more efficient", delete "that" and insert --than--, therefor.

In Column 16, Line 6, before "chemical", delete "an" and insert --a--, therefor.

In Column 19, Line 26, delete "solvants" and insert --solvents--, therefor.

In Column 21, Line 45, after "printhead", delete "was replaced was replaced" and insert --was replaced--, therefor.

Signed and Sealed this
Twenty-sixth Day of September, 2023

Katherine Kelly Vidal
*Director of the United States Patent and Trademark Office*